(12) United States Patent
Kubota et al.

(10) Patent No.: US 6,340,558 B1
(45) Date of Patent: Jan. 22, 2002

(54) POLISHING METHOD AND FABRICATION METHOD OF THIN FILM MAGNETIC HEAD

(75) Inventors: Toshio Kubota; Masumi Sugawara; Takehiro Horinaka; Fujimi Kimura, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/450,773

(22) Filed: Nov. 30, 1999

(30) Foreign Application Priority Data

Dec. 28, 1998 (JP) ............................................. 10-372213

(51) Int. Cl.[7] ................................................ B24B 37/00
(52) U.S. Cl. ........................ 430/320; 430/319; 216/22; 216/38; 29/603.16
(58) Field of Search .................................. 430/320, 319, 430/313; 216/22, 38; 29/603.16, 603.18

(56) References Cited

U.S. PATENT DOCUMENTS 5,498,565 A * 3/1996 Gocho et al. .................. 437/67

* cited by examiner

Primary Examiner—John A. McPherson
(74) Attorney, Agent, or Firm—Oliff & Berridge, PLC

(57) ABSTRACT

This invention relates to a polishing method for polishing a surface of a material to be polished and a fabrication method of a thin film magnetic head having a planarization process for planarizing the surface of the material to be polished by polishing, and an object thereof is to reduce variations of a residual film thickness on the surface of a material to be polished after polishing. An insulating film 14 is formed on an AlTiC substrate 12 and a bottom shielding layer 16 is formed thereover. After forming a coating layer 18 and etching a mask layer 22 as an etching mask, a protruding portion of the coating layer 18 at the bottom of the opening of the mask layer 22 is removed by a desired thickness. Since a protruding portion of the coating layer 18 on the periphery of the opening of the mask layer is suitably undercut, the protruding portion is shaved, thereby obtaining the coating layer 18 which is planarized as a whole.

12 Claims, 13 Drawing Sheets

POLISHING METHOD AND FABRICATION METHOD OF THIN FILM MAGNETIC HEAD

BACKGROUND OF THE INVENTION

1. Field of the Invention

The present invention relates to a polishing method for polishing a surface of a material to be polished and a fabrication method of a thin film magnetic head having a planarization process for planarizing the surface of the material to be polished by polishing.

2. Description of the Related Art

In a fabrication of a thin film magnetic head used for reading and writing heads of a magnetic disk drive, a chemical mechanical polishing (hereinafter, a CMP) is used for forming a surface with a high flatness. In the CMP, first, a polishing surface of a polishing pad covered on a rotating polishing surface plate and a surface to be polished of a substrate which is a material to be polished supported by a polishing head contact with pressure. Supplying slurry, which is an abrasive material, on the surface to be polished of the polishing pad and rotating each of the polishing pad and the polishing head, the surface to be polished is polished chemically and mechanically by supplying the slurry between the polishing pad and the surface to be polished. By the polishing using this CMP, a desired flatness can be achieved at a global area as well as at a local area.

Elastic bodies such as a foaming urethane which, for example, is a porous material and has fine irregularities on a surface thereof are used for the polishing pad. Therefore, during the polishing, the polishing surface of the polishing pad copies a shape (irregularities) of the opposing surface of the material to be polished and contacts to substantially the whole surface of the material to be polished. Therefore, in a surface plate polishing by a general mechanical polishing, the polishing pad only strikes protruding portions on the surface to be polished, thereby polishing substantially only the protruding portions. On the other hand, in the polishing by the CMP, the polishing on a surface at a lower position is also proceeded because the polishing surface of the polishing pad contacts to the surface at the position lower than the protruding portion. However, since a contact pressure with the polishing surface of the polishing pad is greater at the protruding portion than the surface at the lower position, the protruding portion is polished relatively faster, thereby the planarization of the surface to be polished is proceeded.

The conventional planarization process using the CMP in the fabrication process of the thin film magnetic head is briefly described with reference to FIG. 24. FIG. 24 shows a cross section of a substrate which is obtained by cutting a pole portion of the thin film magnetic head in parallel with a track plane. As shown in FIG. 24, an insulating layer 62 which is a lower layer made of alumina ($Al_2O_3$) is formed on an AlTiC substrate 60 and a bottom shielding layer 64 which is approximately 3 $\mu$m in thickness and made of permalloy is formed thereon. It will be noted that the two bottom shielding layers 64 are shown in FIG. 24.

In order to planarize the upper surface of the bottom shielding layer 64, as shown FIG. 24, alumina is deposited on the whole surface of the substrate and the bottom shielding layer 64 is embedded and coated by forming a coating layer 66 having 4.5 $\mu$m in thickness which is 1.5 times thicker than the film thickness of the bottom shielding layer 64. At this time, the coating layer 66 over the bottom shielding layer 64 which is a thin film pattern is a protrusion of 7.5 $\mu$m in height from the insulating layer 62.

Thus, after embedding and coating the surface of the substrate 60, on which the bottom shielding layer 64 which is the thin film pattern is formed, by the coating layer 66, the polishing by the CMP is started as it is. After the upper portion of the bottom shielding layer 64 of the thin film pattern is exposed from the coating layer 66 by the polishing by the CMP, the polishing is further proceeded to form a planarized layer with a predetermined film thickness. Thus, in the planarization process of the thin film magnetic head, a protrusion due to the coating layer is formed at the upper portion of the thin film pattern when the coating layer is formed on the surface of the substrate. Therefore, in order to form the planarized layer with a desired film thickness, the coating layer is required to be planarized by polishing as much protruding portion as possible before the upper portion of the thin film pattern exposes from the coating layer. Therefore, in the conventional planarization process using the CMP in the fabrication process of the thin film magnetic head, the film thickness of the deposited coating layer is required to be formed quite thick.

For example, when the upper surface is planarized after an element having a film thickness of 2~10 $\mu$m is embedded and coated with the coating layer made of alumina, as described above, the film thickness of the coating layer is required to be fabricated approximately 1.5 times thicker than the film thickness of the element in the conventional polishing method according to the CMP method. Therefore, the height of the coating layer which is the upper portion of the element to be the protrusion is equal to 3~15 $\mu$m from the insulating layer 62.

When almina which is the coating layer deposited to such thickness is largely removed by the polishing by the CMP, the variations of the removal amount inevitably become large and consequently the variations of the residual film thickness on the surface of the material to be polished after the polishing becomes large. In short, according to the planarization by the conventional CMP, the variations of heights on the surface to be polished can not be reduced, thereby resulting in the cause of the reduction in yield in the element fabrication.

Further, in the fabrication process of the conventional thin film magnetic head, the fabrication process for the coating layer in the planarization process is time-consuming and therefore leads to an inhibitory factor for improving a throughput of the element fabrication.

SUMMARY OF THE INVENTION

An object of the present invention is to provide a polishing method for reducing the variations of a residual film thickness on the surface of a material to be polished after polishing.

Another object of the present invention is to provide a fabrication method for reducing the time required for a polishing process.

A further object of the present invention is to provide a fabrication method of a thin film magnetic head which improves a yield of the element fabrication by reducing the variations of the residual film thickness on a surface of the material to be polished after polishing.

A furthermore object of the present invention is to provide a fabrication method for a thin film magnetic head which improves a throughput of the element fabrication by reducing the time required in a polishing process.

Above objects are achieved by a polishing method of polishing a surface of a material to be polished comprising the step of polishing the surface after reducing a film thickness at a protruding portion formed on the surface.

Also, the polishing method of this invention comprises the steps of patterning an etching protection film after forming the etching protection film on the surface, opening the etching protection film over the protruding portion and reducing the film thickness of the protruding portion by etching.

Further, in the polishing method of this invention, the protruding portion is formed on a coating layer over the thin film pattern, the coating layer coats and embeds the thin film pattern formed on the material to be polished. Furthermore, the etching protection film is formed on the coating layer.

In the polishing method of the present invention, the etching is an isotropic etching. Also, the etching protection film is made of photoresist or the etching protection film is made of a metal material.

Further, in the polishing method of the present invention, the opening is formed to have a width equal to or narrower than a width of the thin film pattern or the opening is formed to have a width substantially equal to the length obtained by reducing the double thickness of the film of the thin film pattern from the width of the thin film pattern.

Furthermore, in the polishing method of the present invention, the coating layer is formed to have a film thickness equal to or thicker than the film thickness of the thin film pattern. At the same time, the coating layer is formed of an insulating material. Also, in the polishing method of the present invention, the polishing method comprises the step of polishing the surface by a chemical mechanical polishing after reducing the film thickness of the protruding portion.

The above objects are achieved by a fabrication method of a thin film magnetic head having a planarizion process for planarizing a surface of a material to be polished by polishing comprising the planarization process having any polishing method in the present invention. The planarization process is performed to at least any one of surfaces of a plurality of magnetic layers structuring the thin film magnetic head. Further, the plurality of the magnetic layers includes at least one of a bottom shielding layer, a top shielding layer, and upper pole portion which structure the thin film magnetic head.

DESCRIPTION OF THE PREFERRED EMBODIMENTS

[The First Embodiment of the Present Invention]

Figure 1:
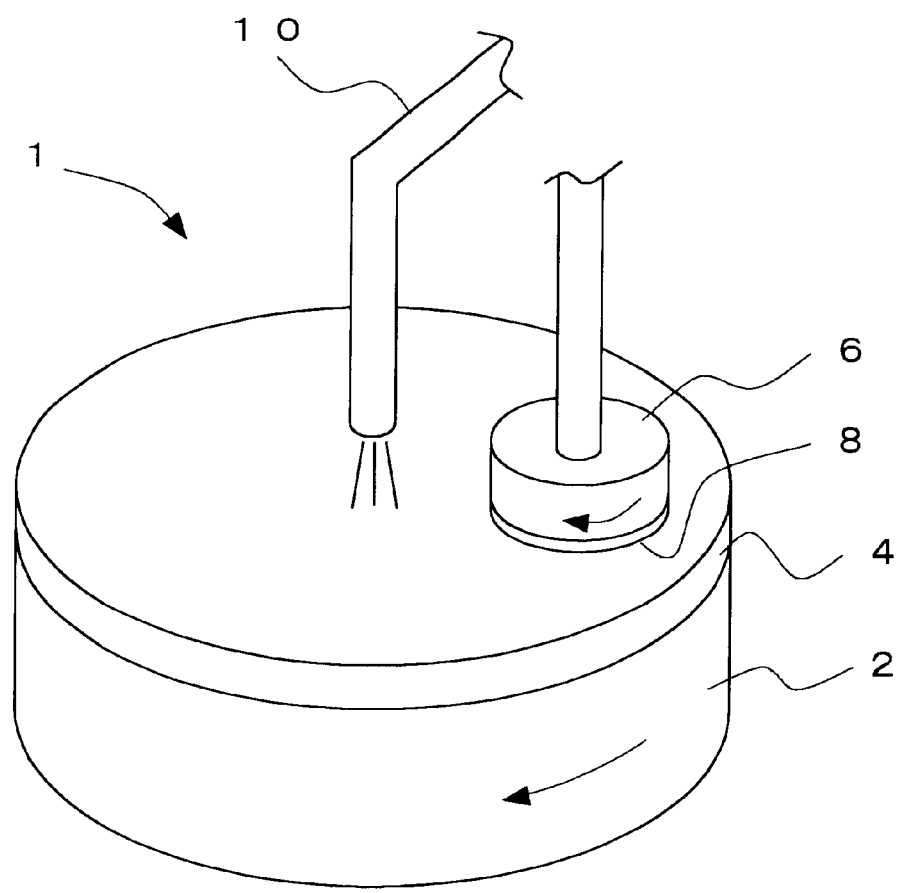
FIG. 1 is a diagram showing a schematic structure of a CMP equipment used in the first embodiment of this invention.

A polishing method and a fabrication method of a thin film magnetic head according to the first embodiment of the present invention are described with reference to FIG. 1 through FIG. 20. First, a fundamental schematic structure of a chemical mechanical polishing equipment (hereinafter, referred to as a CMP equipment), which is used in the polishing method and the fabrication method of the thin film magnetic head according to this embodiment, is described with reference to FIG. 1. FIG. 1 shows the CMP equipment having a conventional general structure. FIG. 1 also shows a state performing a planarization polishing by the CMP by contacting a surface of a substrate 8 to the polishing pad with pressure, where the substrate 8 is a material to be polished. Furthermore, in this embodiment, various CMP equipment used in the past can be used. In FIG. 1, the CMP equipment 1 has a rotating polishing surface plate (a platen) 2. A polishing pad (a polishing cloth) 4 covers a whole surface of the polishing surface plate 2. The polishing pad 4 can be rotated by rotating the polishing surface plate 2 by using a rotational mechanism which is not illustrated.

A substrate 8 is held to be able to rotate by a polishing head 6 and a surface of the substrate 8 which is a surface to be polished contacts with pressure to a polishing surface of the rotating polishing pad 4. Further, a supply opening of a slurry supply pipe 10 supplying slurry (an abrasive material) is located above the polishing surface of the polishing pad 4.

In order to polish the surface of the substrate 8 by such CMP equipment 1, the substrate 8 is first held on the polishing head 6 so that the surface of the substrate 8 as a material to be polished corresponds to the polishing pad 4 side. Then, the polishing surface of the polishing pad 4 and the surface of the substrate 8 contact with pressure so that a predetermined pressure (for example, 400 g/cm$^2$) is produced between both of them. Next, the polishing pad 4 and the surface of the substrate 8 contact with pressure and are rotated by rotating the polishing surface plate 2 and the polishing head 6 respectively, while supplying the slurry from the slurry supply pipe 10 to the polishing surface of the polishing pad 4.

The slurry supplied from the slurry supply pipe 10 to the polishing pad 4 is diffused on the polishing surface of the polishing pad 4 and is supplied between the polishing pad 4 and the surface of the substrate 8 accompanying the relative movement between the surface of the substrate 8 and the polishing pad 4. When the slurry enters between the polishing pad 4 and the surface of the substrate 8, and the polishing pad 4 and the surface of the substrate 8 rub to each other via the slurry, the surface of the substrate 8 is chemically and mechanically polished by the slurry, thereby performing the planarization.

Next, the fabrication method of the thin film magnetic head using the polishing method according to this embodiment is described with reference to FIG. 2 through FIG. 20. In this embodiment, a combination type head laminating an inductive thin film magnetic head for writing and an MR reading element for reading is described as an example. FIG. 2 through FIG. 19 show cross sections of the substrate of a pole section of the thin film magnetic head cut in parallel with a track surface.

Figure 2:
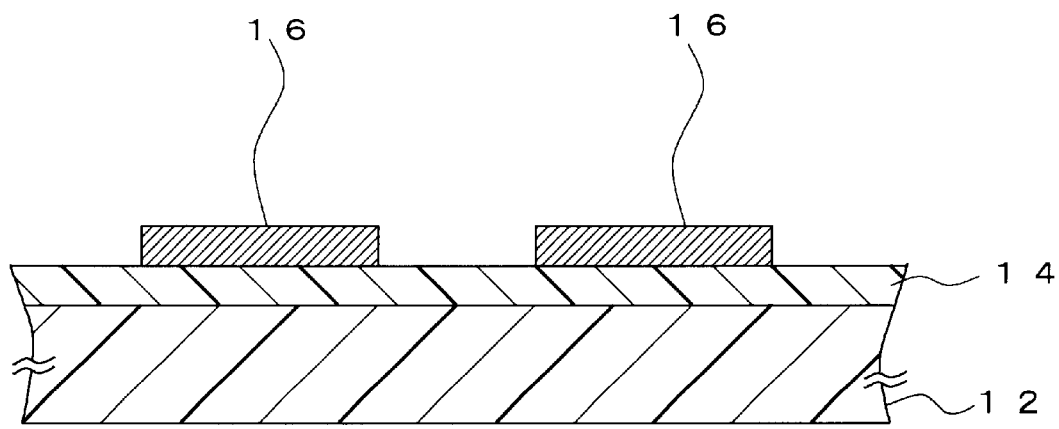
FIG. 2 is a diagram describing a polishing method according to the first embodiment of this invention and a fabrication method of a thin film magnetic head using the aforementioned polishing method.

First, as shown in FIG. 2, an insulating layer 14 which is a lower layer made of alumina ($Al_2O_3$), for example, is deposited on a substrate 12, for example, made of AlTiC. Next, for example, after forming a permalloy (NiFe) layer being approximately 3 $\mu$m in thickness on a whole surface, a bottom shielding layer 16 which is a thin film pattern is formed by patterning. The bottom shielding layer 16 functions as a magnetic shield to protect the MR reading element of an reading head, which is to be formed hereafter, from an influence of an external magnetic field. It will be noted that FIG. 2 illustrates two of a plurality of the bottom shielding layers 16 formed on a substrate.

Figure 3:
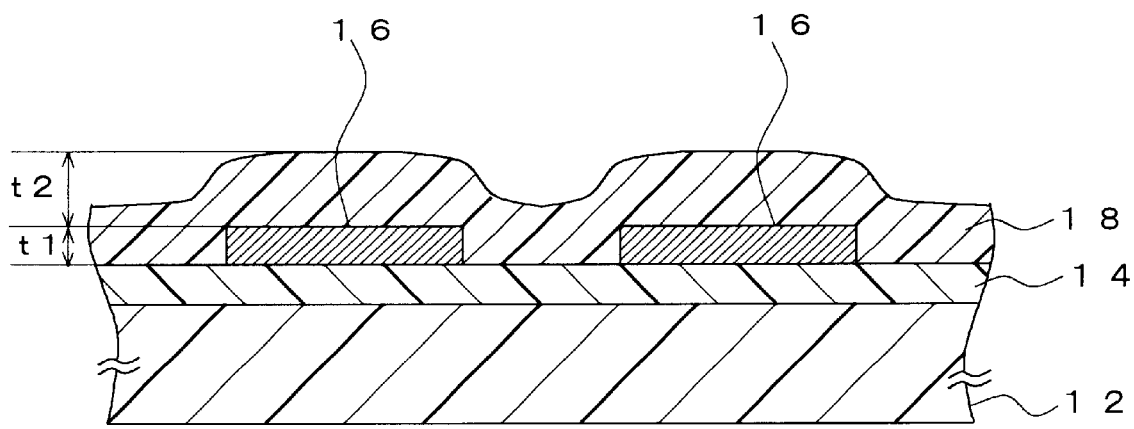
FIG. 3 is a diagram describing a polishing method according to the first embodiment of this invention and a fabrication method of a thin film magnetic head using the aforementioned polishing method.

Next, in order to planarize an upper surface of the bottom shielding layer 16, as shown in FIG. 3, alumina is deposited on the whole surface of the substrate and a coating layer 18, which is approximately equal to 4.5 $\mu$m in thickness, that is, 1.5 times thicker than the bottom shielding layer 16 (t1=3 $\mu$m) in film thickness, is formed to embed and coat the bottom shielding layer 16. At this time, the coating layer 18 above the bottom shielding layer 16 becomes a protruding portion a height of which from the insulating layer 14 is approximately 7.5 $\mu$m (=t1+t2) since the film thickness t1=3 $\mu$m of the bottom shielding layer 16 is added to the film thickness (t2=4.5 $\mu$m) of the coating layer 18 itself.

Figure 4:
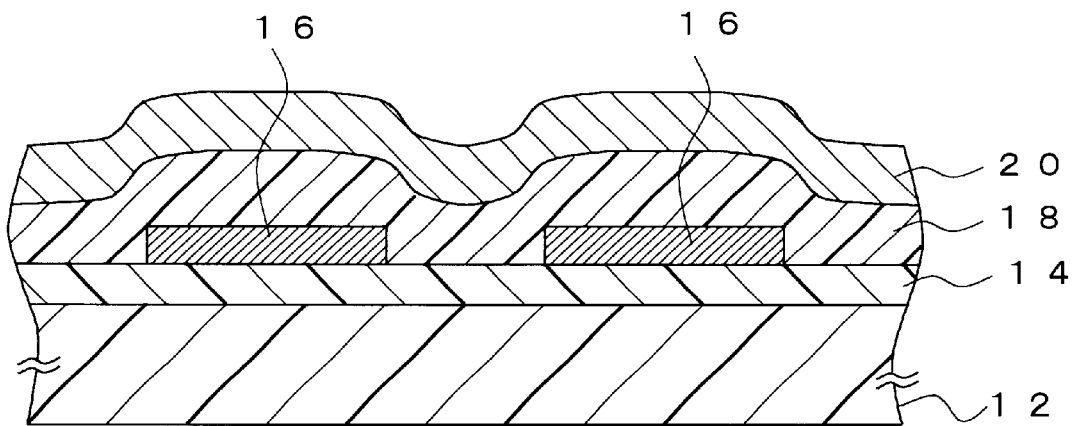
FIG. 4 is a diagram describing a polishing method according to the first embodiment of this invention and a fabrication method of a thin film magnetic head using the aforementioned polishing method.
Figure 5:
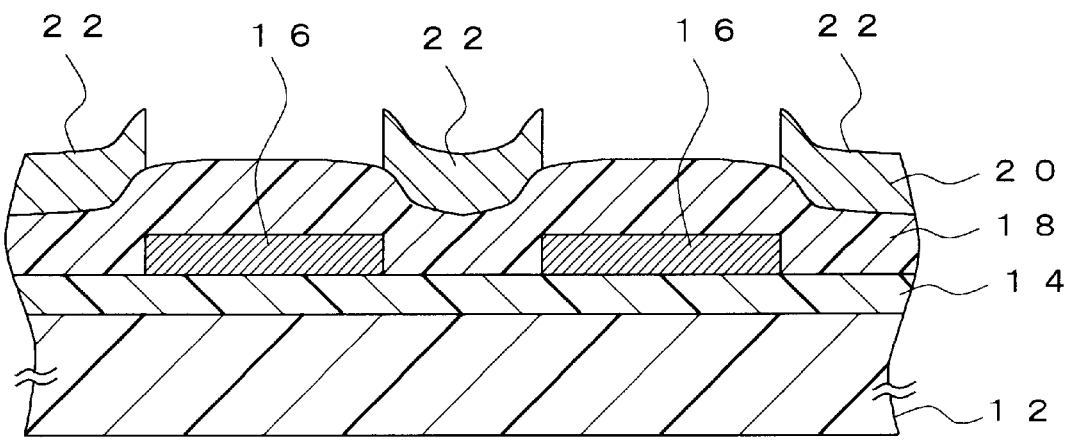
FIG. 5 is a diagram describing a polishing method according to the first embodiment of this invention and a fabrication method of a thin film magnetic head using the aforementioned polishing method.

Next, as shown in FIG. 4, a photoresist layer 20 is formed by coating a photoresist being approximately equal to 4 $\mu$m in thickness on the whole surface of the substrate photoresist using a spin coater (not shown) or the like. Next, the substrate 12 is placed at an exposure stage of a projection aligner and a reticle image forming an opening pattern slightly narrower than the width of the bottom shielding layer 16 is then transferred to the photoresist layer 20. After the substrate 12, in which the exposure is completed, is developed and the photoresist layer 20 is patterned, as shown in FIG. 5, a mask layer 22 having an opening at the protruding portion at the upper portion of the bottom shielding layer 16 is formed.

Figure 6:
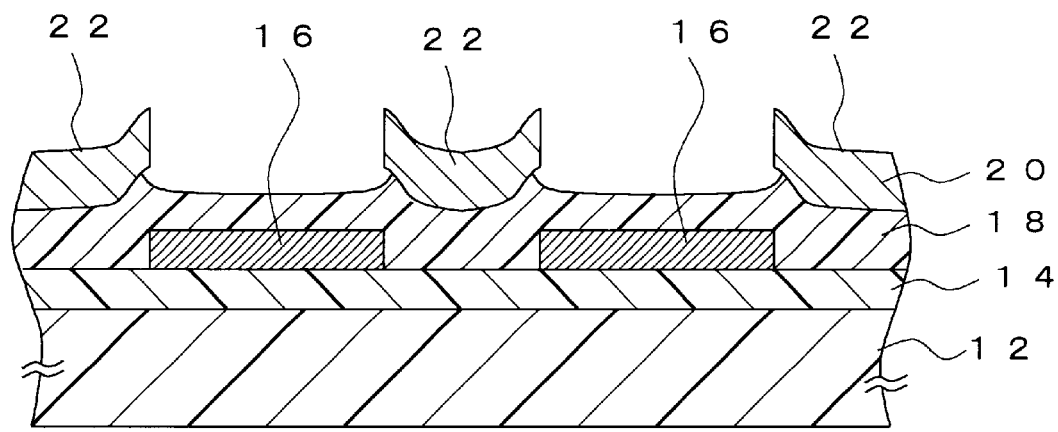
FIG. 6 is a diagram describing a polishing method according to the first embodiment of this invention and a fabrication method of a thin film magnetic head using the aforementioned polishing method.

Next, as shown in FIG. 6, an isotropic etching by the a wet etching is performed using the mask layer 22 as a etching mask, thereby the protruding portion of the coating layer 18 at the bottom of the opening of the mask layer 22 is removed by approximately 3 $\mu$m which is the thickness of the bottom shielding layer 16. Since the coating layer 18 on the periphery of the opening of the mask layer 22 is suitably undercut, in comparison with the state shown in FIG. 3, the protruding portion is shaved and, as a whole, a planarized coating layer 18 can be obtained.

Figure 7:
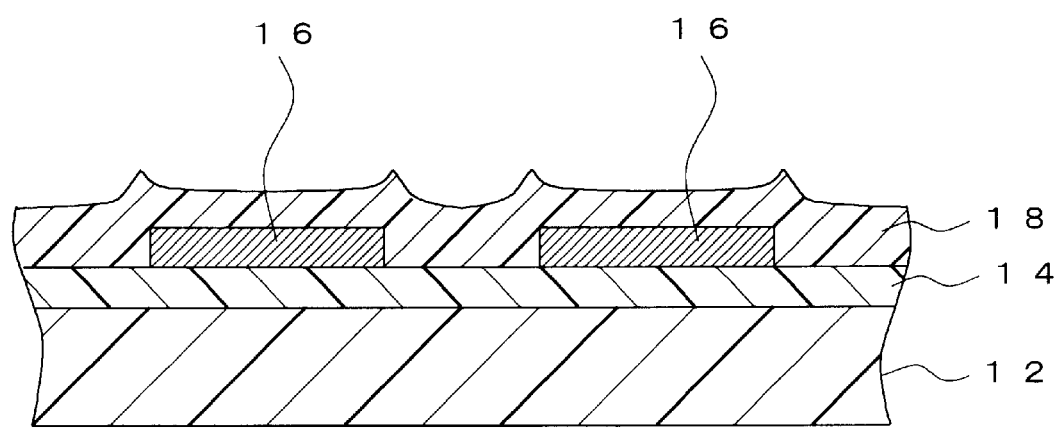
FIG. 7 is a diagram describing a polishing method according to the first embodiment of this invention and a fabrication method of a thin film magnetic head using the aforementioned polishing method.
Figure 8:
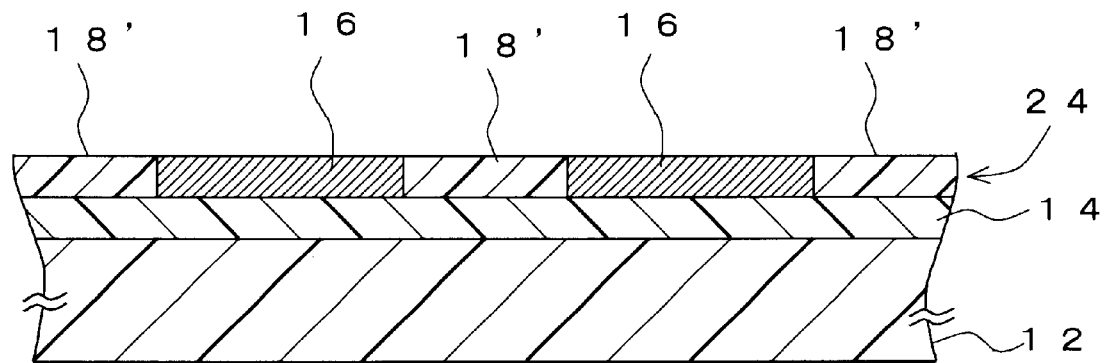
FIG. 8 is a diagram describing a polishing method according to the first embodiment of this invention and a fabrication method of a thin film magnetic head using the aforementioned polishing method.
Figure 9:
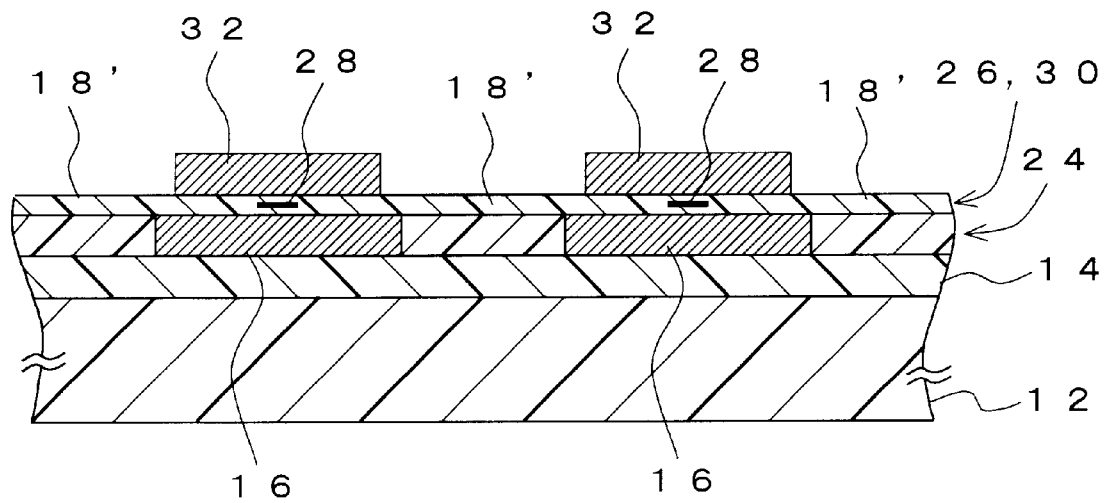
FIG. 9 is a diagram describing a polishing method according to the first embodiment of this invention and a fabrication method of a thin film magnetic head using the aforementioned polishing method.

Next, as shown in FIG. 7, after removing the mask layer 22, a planarization process is performed according to the CMP by using the CMP equipment shown in FIG. 1 and the upper surface of the substrate 12 is planarized. In the planarization according to the CMP, as shown in FIG. 8, the polishing is performed until the bottom shielding layer 16 is exposed from the coating layer 18. Ultimately, the surface polishing is performed until the thickness of a planarized layer 24, which is structured by the bottom shielding layer 16 and an embedded layer 18' formed by polishing the coating layer 18, becomes approximately 2 $\mu$m.

Thus, in the polishing method according to this embodiment, when polishing the surface of the substrate which is a material to be polished, a distinctive feature is to polish the surface of the substrate after reducing the film thickness of the protruding portion formed on the surface of the substrate. It is also distinctive that the mask layer 22 which opens the etching protection film over the protruding portion by patterning after forming the photoresist layer 20 on the surface of the substrate as an etching protection film in order to reduce the film thickness of the protruding portion, thereby reducing the film thickness of the protruding portion by the etching.

Furthermore, in this embodiment, an example reducing the height of the protruding portion formed at the coating layer 18 over the bottom shielding layer 16 is described. However, height of protruding portions formed in other areas on the surface of the substrate can be reduced by similarly patterning and etching a mask layer.

Further, in the polishing method according to this embodiment, though photoresist is used as a material for the etching protecting film, for example, a metal material such as Ti can be of course used.

Moreover, the opening of the protruding portion over the mask layer 22 is set to have a slightly narrower opening width than the width of the bottom shielding layer 16. However, considering the characteristics and the like of an etchant to be used, the same or narrower width than the width of the bottom shielding layer 16 can be properly selected. For example, if a step at the protruding portion of the deposited coating layer 18 is steep, the opening over the protruding portion on the mask layer 22 may be formed to have almost the same width as the length derived by subtracting twice the film thickness of the bottom shielding layer 16 from the width of the bottom layer shielding layer 16. In this way, as an ideal, the height of the protruding portion can be reduced the same as the film thickness of the bottom shielding layer 16 by the isotropic etching.

Figure 20:
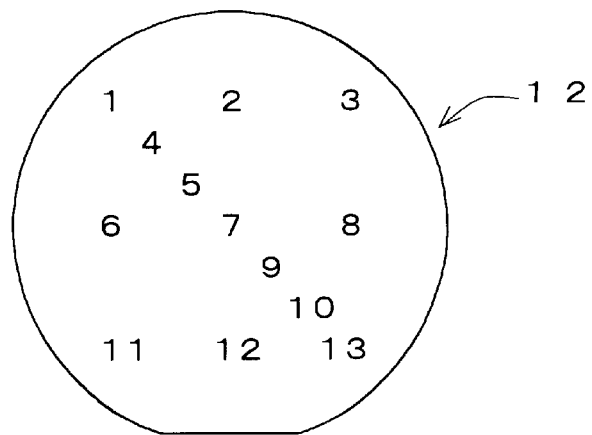
FIG. 20 is a diagram showing the locations of film thickness measurement on a substrate according to the first embodiment of this invention.

In the meantime, Table 1 shows an example of a specific result of the planarization by the CMP at the bottom shielding layer 16 and the coating layer 18 according to this embodiment. Data shown in Table 1 shows a result of film thickness measured at a total of 13 points, where the 13 points are, as shown in FIG. 20, four vertexes of the square, middle points of the four sides and five points on one diagonal line. In the film thickness measurement, for example, a non-contact optical film thickness measurement equipment can be used. As shown in Table 1, in this embodiment, the film thickness of the deposited coating layer 18 is equal to 4.5981 $\mu$m on an average value and also the range of the measured film thickness is equal to 70.6 nm. Further, the removal amount by the CMP is equal to 2.6026 $\mu$m on an average value and the range is 0.2679 $\mu$m. Furthermore, the film thickness of the planarized layer 24 is equal to 1.9955 $\mu$m on an average value and the range (Range; R=(Maximum value: Max)−(Minimum value: Min)) is equal to 0.2640 $\mu$m.

TABLE 1

|  | Average value | Range |
| --- | --- | --- |
| Film thickness of coating layer 18 | 4.5981 | 0.0706 |
| Removal amount by CMP | 2.6026 | 0.2679 |
| Film thickness of planarized layer 24 | 1.9955 | 0.2640 |

Unit: micrometer ($\mu$m)

Table Showing Film Thickness of a Planarized Layer Which Includes a Bottom Shielding Layer Formed According to the First Embodiment On the other hand, Table 2 shows a polishing result, as a comparative example, when the conventional polishing method is used. The planarization process according to this comparative example is the same as the process shown in FIG. 2 and FIG. 3 according to this embodiment. Precisely, after forming a lower layer made of alumina on the AlTiC substrate 12, the bottom shielding layer 16 is formed by patterning after a permalloy layer, for example, is formed on a whole surface by approximately 3 $\mu$m in thickness.

Next, in order to planarize the upper surface of the bottom shielding layer 16, the coating layer 18 is formed by depositing alumina by approximately 4.5 $\mu$m in thickness which is 1.5 times thicker in film thickness than the bottom shielding layer 16. The bottom shielding layer 16 is then embedded and coated. Namely, the coating layer 18 over the bottom shielding layer 16 becomes a protruding portion. In this state, polishing for the planarization is performed using the CMP equipment shown in FIG. 1.

As shown in Table 2, according to the conventional planarization process, the film thickness of the deposited coating layer 18 is equal to 4.6253 $\mu$m on an average value and the range of the film thickness measured is equal to 68.5 nm. The removal amount by the CMP is equal to 2.5722 $\mu$m on an average value and the range is equal to 0.3302 $\mu$m. Furthermore the film thickness of the planarized layer 24 is equal to 2.0531 $\mu$m on an average value and the range is 0.3387 $\mu$m.

TABLE 2

|  | Average value | Range |
| --- | --- | --- |
| Film thickness of coating layer 18 | 4.6253 | 0.0685 |
| Removal amount by CMP | 2.5722 | 0.3302 |
| Film thickness of planarized layer 24 | 2.0531 | 0.3387 |

Unit: micrometer ($\mu$m)

Table Showing Film Thickness of a Planarized Layer Which Includes a Bottom Shielding Layer Formed by the Conventional CMP Based on Table 1 and Table 2, the planarization process using the polishing method according to this embodiment and the planarization process using the conventional polishing method according to the comparative example are compared. First, in this embodiment as well as in the comparative example, the film thickness of the deposited coating layer 18 is also substantially the same and the extents of the range are substantially the same. Therefore, the removal amounts of the coating layer 18 by the CMP are the same and the average values of the CMP removal amounts according to Table 1 and Table 2 are the same. However, it is found that, according to this embodiment, the range of the CMP removal amount is approximately 20% smaller than that of the comparative example. Furthermore, as to the film thickness of the planarized layer 24, with respect to the desirable film thickness of 2 $\mu$m, the average value of 1.9955 $\mu$m is achieved according to this embodiment and the average value of 2.0531 $\mu$m is achieved according to the comparative example, therefore both are the same. However, it is found that, according to this embodiment, the range of the film thickness of the planarized layer 24 is approximately 20% smaller compared to that of the comparative example.

Thus, by using the polishing method according to this embodiment, in comparison with heretofore, it is possible to reduce variations in residual film thickness of the surface of the substrate after polishing. Furthermore, as a result of this embodiment, it is possible to realize a fabrication method of a thin film magnetic head which improves a yield of a element fabrication by reducing the variations in residual film thickness of surface of the substrate after polishing.

In the meantime, after completing the formation of the planarized layer 24 at the bottom shielding layer 16 as described above, as shown in FIG. 9, an insulating layer 26 is formed by depositing alumina at predetermined thickness by way of spattering, then, a material having a magnetoresistive effect for structuring the MR reading elements is deposited and patterned, thereby forming a magnetoresistive layer 28.

Next, an insulating layer 30 is formed and the magnetoresistive layer 28 is embedded between the insulating layers 26 and 30. Then, a top shielding layer 32 the formation material of which is permalloy (an alloy of Ni and Fe) is formed to approximately 4.5 μm in film thickness. This top shielding layer 32 as well as the bottom shielding layer 16 has a function to magnetically shield the MR reading elements. Moreover, the top shielding layer 32 also has a function as a bottom magnetic layer (a bottom pole) of the thin film magnetic head for writing.

Figure 10:
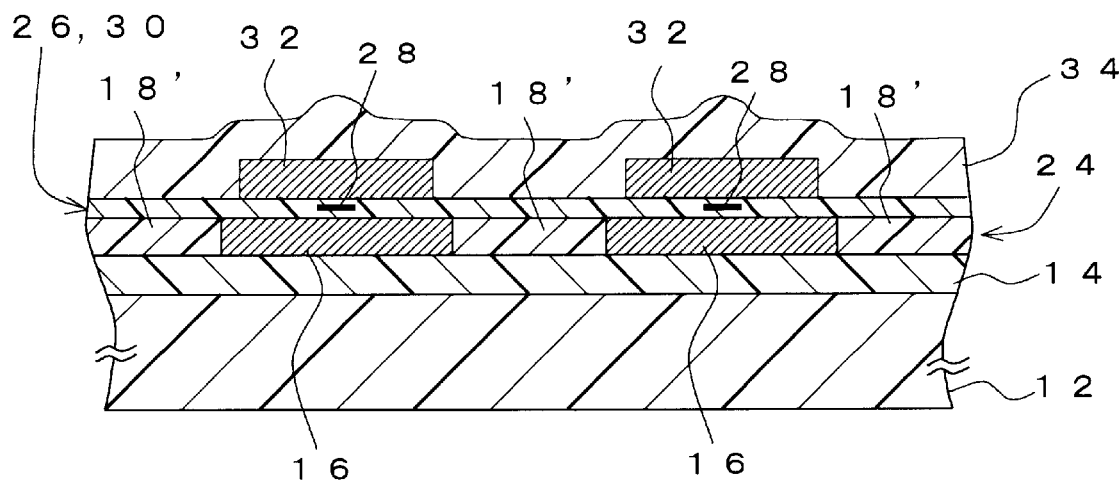
FIG. 10 is a diagram describing a polishing method according to the first embodiment of this invention and a fabrication method of a thin film magnetic head using the aforementioned polishing method.

Next, in order to planarize an upper surface of the top shielding layer 32, as shown in FIG. 10, alumina is deposited on the whole surface of the substrate and then a coating layer 34 is formed to a thickness of approximately 6.75 μm which is 1.5 times thicker than the film thickness of the top shielding layer 32, and the top shielding layer 32 is embedded and coated. At this time, the coating layer 34 above the top shielding layer 32 becomes a protruding portion the height of which from the insulating layer 30 is approximately 11.25 μm since the film thickness (=4.5 μm) of the top shielding layer 32 is added to the film thickness (=6.75 μm) of the coating layer 34 itself.

Figure 11:
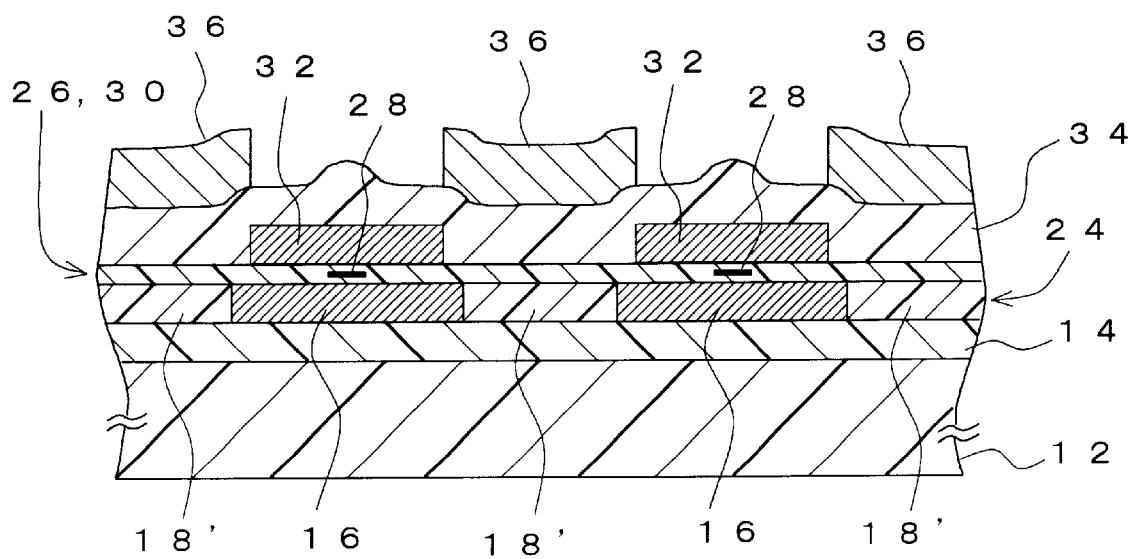
FIG. 11 is a diagram describing a polishing method according to the first embodiment of this invention and a fabrication method of a thin film magnetic head using the aforementioned polishing method.

Next, a photoresist layer is formed by coating the whole surface of the substrate with approximately 4 μm thick photoresist and patterned to form the opening which is slightly narrower than the width of the top shielding layer 32 on the top shielding layer 32, then, as shown in FIG. 11, thereby forming a mask layer 36 having an opening over the protruding portion above the top shielding layer 32.

Figure 12:
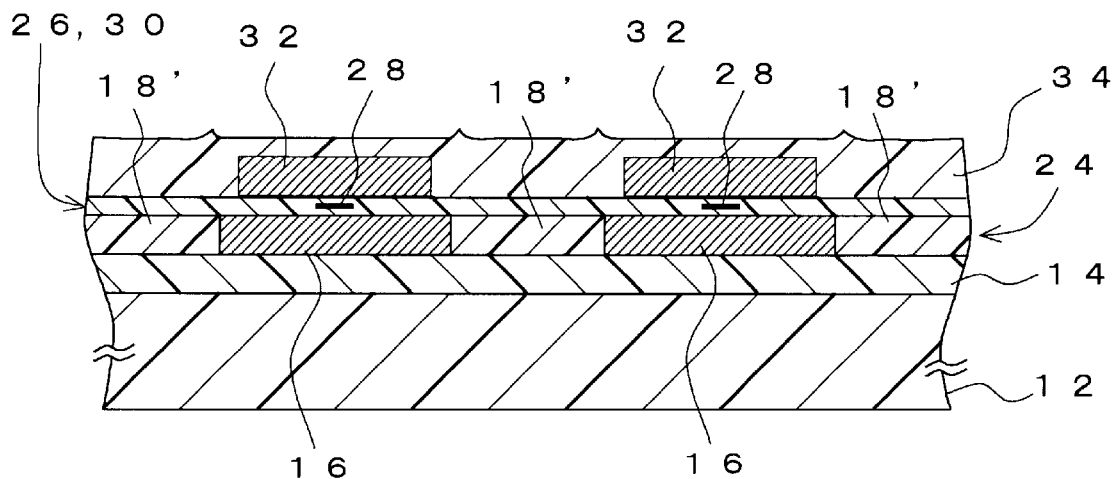
FIG. 12 is a diagram describing a polishing method according to the first embodiment of this invention and a fabrication method of a thin film magnetic head using the aforementioned polishing method.
Figure 13:
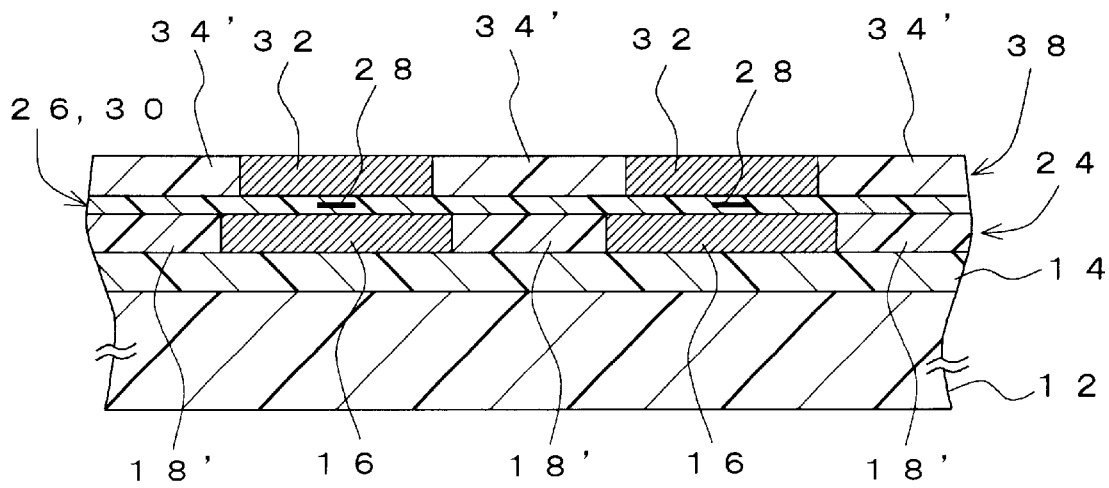
FIG. 13 is a diagram describing a polishing method according to the first embodiment of this invention and a fabrication method of a using the aforementioned polishing method.

Next, an isotropic etching by a wet etching is performed using the mask layer 36 as an etching mask and the protruding portion of the coating layer 34 at the bottom of the opening of the mask layer 36 is removed by approximately 4.5μm, that is, an equivalent thickness of the top shielding layer 32. Since the coating layer 34 on the periphery of the opening of the mask layer 36 is suitably undercut, as shown in FIG. 12, the protruding portion is shaved and, as a whole, a planarized coating layer 34 can be obtained. After removing the mask layer 36, the CMP is performed by using the CMP equipment shown in FIG. 1 and the upper surface of the substrate 12 is planarized. In planarization by the CMP, as shown in FIG. 13, polishing is performed until the top shielding layer 32 is exposed from the coating layer 34. Ultimately, planarization is performed until the thickness of a planarized layer 38, which is structured by the top shielding layer 32 and an embedded layer 34 formed by polishing the coating layer 34, becomes approximately 3.5 μm.

The polishing method described above, similarly to forming the planarized layer 24 including the bottom shielding layer 16, also has a distinctive feature where a substrate surface is polished after reducing the film thickness of the protruding portion formed on the surface of the substrate. It will be noted that since a distinctive feature concerning to the formation of the planarized layer 38 including the top shielding layer 32 is substantially the same with the aforementioned distinctive feature concerning to the formation of the planarized layer 24 including the bottom shielding layer 16, such description is omitted.

In the meantime, Table 3 shows an example of a result of the planarization by the CMP at the top shielding layer 32 and the coating layer 34 according to this embodiment. Data shown in Table 3 also shows a result of film thickness measured at a total of 13 points on the substrate as shown in FIG. 20. As shown in Table 3, in this embodiment, the film thickness of the depositing coating layer 34 is equal to 6.7983 μm on an average value and the range of film thickness measured is 0.1200 μm. The removal amount by CMP is equal to 3.2697 μm on an average value and the range is 0.3054 μm. Furthermore, the film thickness of the planarized layer 38 is equal to 3.5286 μm on an average value and the range is 0.3028 μm.

TABLE 3

|  | Average value | Range |
|---|---|---|
| Film thickness of coating layer 34 | 6.7983 | 0.1200 |
| Removal amount by CMP | 3.2697 | 0.3054 |
| Film thickness of planarized layer 38 | 3.5286 | 0.3028 |

Unit: micrometer (μm)

Table Showing Film Thickness of a Planarized
Layer Which Includes a Top Shielding Layer
Formed According to the First Embodiment On the other hand, Table 4 shows a polishing result as a comparative example when a conventional polishing method is used. This comparative example shows a planarization process using a polishing method without the process to reduce film thickness of a protruding portion as shown in FIG. 11 according to this embodiment. Precisely, in order to planarize an upper surface of the top shielding layer 32, as shown in FIG. 10, a coating layer 34 is formed by depositing alumina by approximately 6.75 μm in thickness which is 1.5 times thicker than the film thickness of the top shielding layer 32, then, the top shielding layer 32 is embedded. At this time, a protruding portion the height of which from the insulating layer 30 is equal to approximately 11.25 μm is formed on the coating layer 34, as a thin film pattern, above the top shielding layer 32. In this state, polishing for the planarization is performed by the CMP equipment shown in FIG. 1

As shown in Table 4, according to the conventional planarization process, the film thickness of the deposited coating layer 34 is equal to 6.7213 μm on an average value and the range of film thickness measured is 0.1025 μm. The removal amount by CMP is equal to 3.1367 μm on an average value and the range is 0.3668. Furthermore, the film thickness of the planarized layer 38 is equal to 3.5846 on an average value μm and the range is 0.3858 μm.

TABLE 4

|  | Average value | Range |
|---|---|---|
| Film thickness of coating layer 34 | 6.7213 | 0.1025 |
| Removal amount by CMP | 3.1367 | 0.3668 |
| Film thickness of planarized layer 38 | 3.5846 | 0.3858 |

Unit: micrometer (μm)

Table Showing Film Thickness of a Planarized
Layer Which Includes a Top Shielding Layer
Formed by the Conventional CMP Based on Table 3 and Table 4, the planarization process using the polishing method according to this embodiment and the planarization process using the conventional polishing method according to the comparative example are compared. First, in both of this embodiment and the comparative example, the film thickness of the deposited coating layer 34 is substantially the same and the extents of the range are substantially the same. Therefore, the removal amounts of the coating layer 34 by CMP are substantially the same and the average values of CMP removal amount according to Table 3 and Table 4 are the same. However, it is found that, in this embodiment, the range of CMP removal amount is approximately 20% smaller than that of the comparative example. Thus, even as to the film thickness of the planarized layer 24, both are equivalent in a point that, with respect to the desirable film thickness which is 3.5 μm, the average value of 3.5286 μm is achieved according to this embodiment and the average value of 3.5846 μm is achieved according to the comparative example. However, it is found that the film thickness range of the planarized layer 38 is approximately 20% smaller compared with that of the comparative example.

Thus, by using the polishing method according to this embodiment, in comparison with heretofore, it is possible to reduce the variations in residual film thickness of the surface of the substrate after polishing. Furthermore, according to this embodiment, it is possible to reduce the variations in residual film thickness of the surface of the substrate after polishing, therefore a fabrication method of the thin film magnetic head which improves a yield of fabricating elements can be realized.

Figure 14:
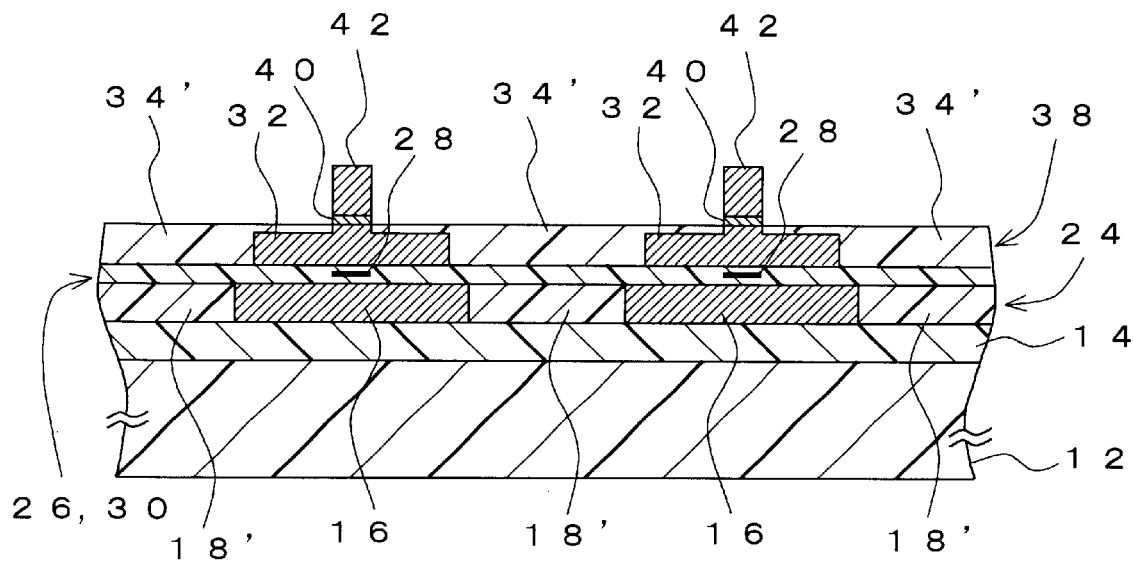
FIG. 14 is a diagram describing a polishing method according to the first embodiment of this invention and a fabrication method of a thin film magnetic head using the aforementioned polishing method.

In the meantime, after completing the formation of the planarized layer 38 at the top shielding layer (bottom pole) 32, as shown in FIG. 14, a write gap layer 40 made of a non-magnetic material such as alumina, for example, is formed, and then a pole tip 42 which forms a part of a top pole made of a high saturation magnetic flux density material, for example, such as permalloy or iron nitride (FeN) is formed to approximately 5 μm in thickness. A track width is defined by the width "W" of the pole tip 42 formed in a predetermined shape.

Figure 15:
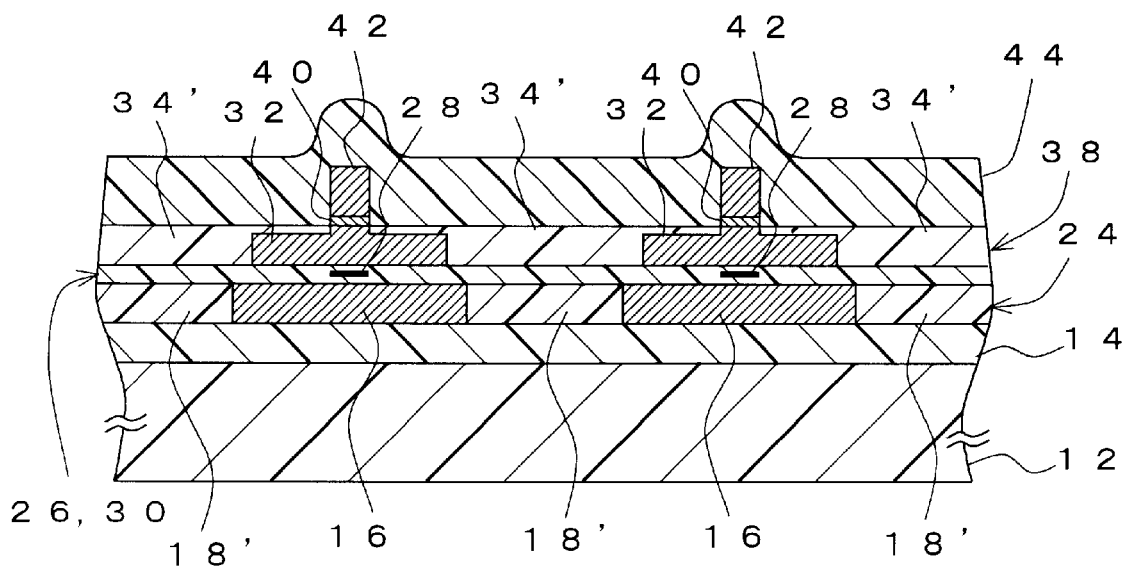
FIG. 15 is a diagram describing a polishing method according to the first embodiment of this invention and a fabrication method of a thin film magnetic head using the aforementioned polishing method.

Next, in order to planarize an upper surface of the pole tip 42, as shown in FIG. 15, alumina is deposited on the whole surface of the substrate and a coating layer 44 is formed to approximately 7.5 μm in thickness which is 1.5 times thicker than the film thickness of the pole tip 42, thereby embedding and coating the pole tip 42. At this time, the coating layer 44 above the pole tip 42 becomes a protruding portion which is approximately 12.5 μm in height from the planarized layer 38 since the film thickness (=5 μm) of the pole tip 42 is added to the film thickness (=7.5 μm) of the coating layer 44 itself.

Figure 16:
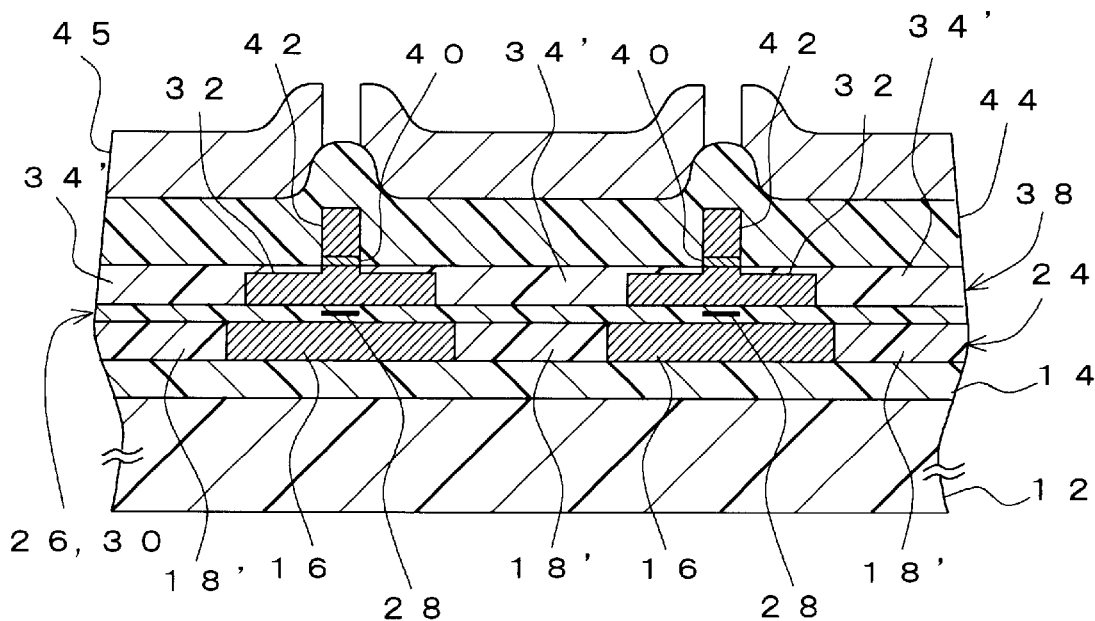
FIG. 16 is a diagram describing a polishing method according to the first embodiment of this invention and a fabrication method of a thin film magnetic head using the aforementioned polishing method.

Next, a photoresist layer is formed by coating the whole surface of the substrate with the photoresist being equal to approximately 4 μm in thickness and a mask layer 45 having an opening over the protruding portion above the pole tip 42, as shown in FIG. 16, is formed on the pole tip 42 by patterning to form an opening slightly narrower than the width of the pole tip 42.

Figure 17:
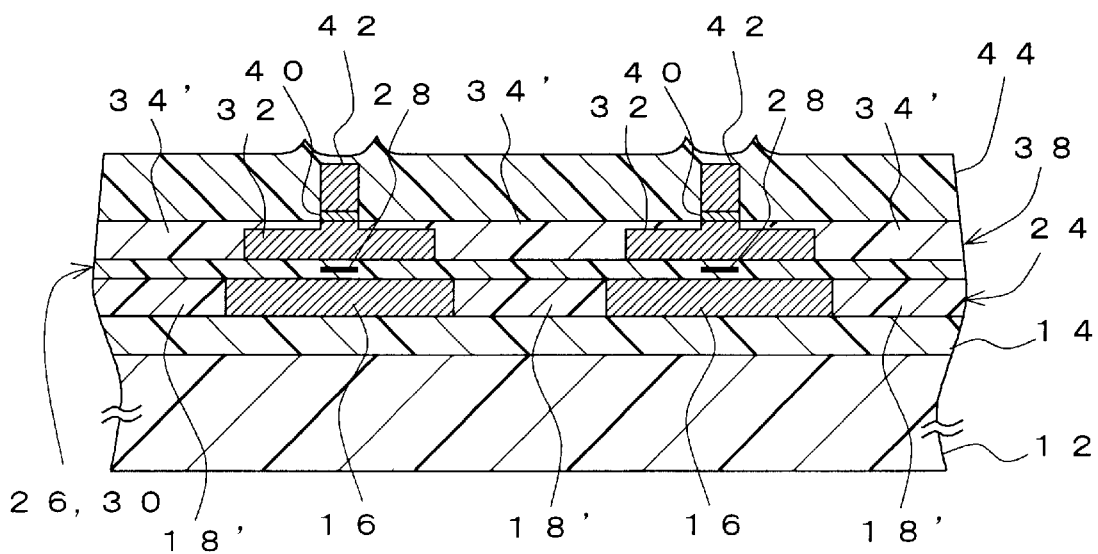
FIG. 17 is a diagram describing a polishing method according to the first embodiment of this invention and a fabrication method of a thin film magnetic head using the aforementioned polishing method.
Figure 18:
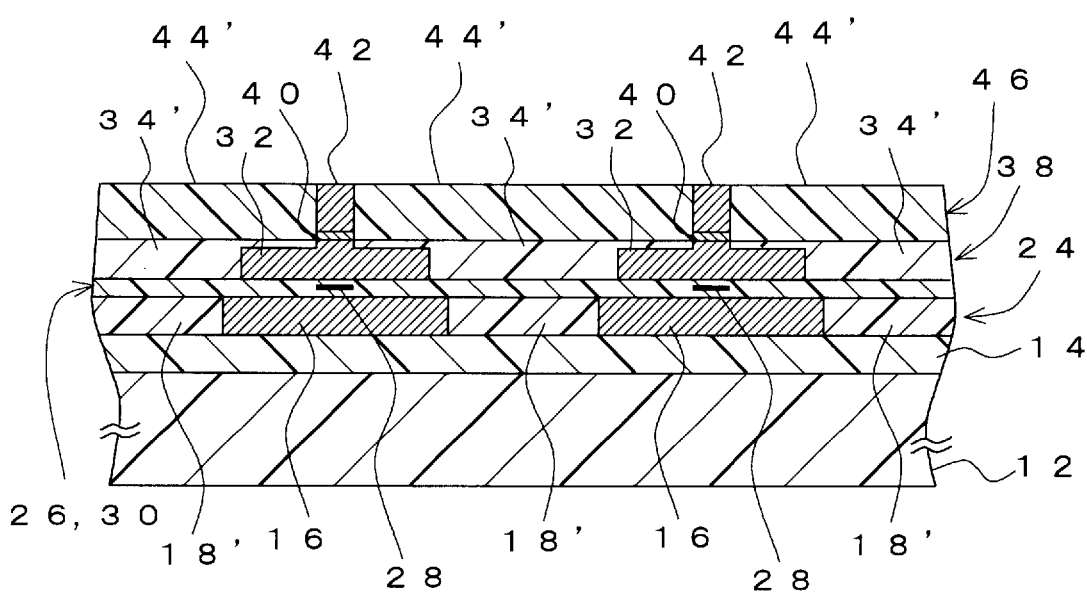
FIG. 18 is a diagram describing a polishing method according to the first embodiment of this invention and a fabrication method of a thin film magnetic head using the aforementioned polishing method.

Next, an isotropic etching by the wet etching is performed using the mask layer 45 as a etching mask, thereby the protruding portion of the coating layer 44 at the bottom of the opening of the mask layer 45 is removed by approximately 5 μm in thickness, that is, the thickness of the pole tip 42. Since the coating layer 44 on the periphery of the opening of the mask layer 45 is suitably undercut, as shown in FIG. 17, the protruding portion is shaved and, as a whole, a planarized coating layer 44 can be obtained. After removing the mask layer 45, the CMP is performed by the CMP equipment shown in FIG. 1 and the upper surface of the substrate 12 is planarized. In planarization according to the CMP, as shown in FIG. 18, polishing is performed until the pole tip 42 is exposed from the coating layer 44 and ultimately the planarization is performed until a planarized layer 46, which consists of the embedded layer 44' formed by polishing the coating layer 44 and the pole tip 42, becomes approximately 4 μm in thickness.

The polishing method described above, similarly to a formation of the planarized layer 24 and the like, also has a distinctive feature where the surface of the substrate is polished after reducing the film thickness of the protruding portion formed on the surface of the substrate. Further, since a distinctive feature concerning to forming the planarized layer 46 including the pole tip 42 is substantially the same with the aforementioned distinctive feature concerning to forming the planarized layer 24 including the bottom shielding layer 16, such description is omitted.

Table 5 shows an example of a result of the planarization by the CMP at the pole tip 42 and the coating layer 44 according to this embodiment. Data shown in Table 5 also shows a result of the film thickness measured at a total of 13 points on the substrate as shown in FIG. 20. As shown in Table 5, in this embodiment, the film thickness of the deposited coating layer 44 is equal to 7.6003 μm on an average value and the range of the measured film thickness is equal to 0.1207 μm. Further, the removal amount by the CMP is equal to 3.4975 μm on an average value and the range is equal to 0.3564 μm. Furthermore, the film thickness of the planarized layer 46 is equal to 4.1028 μm on an average value and the range is 0.3784 μm.

TABLE 5

|  | Average value | Range |
| --- | --- | --- |
| Film thickness of coating layer 44 | 7.6003 | 0.1207 |
| Removal amount by CMP | 3.4975 | 0.3564 |
| Film thickness of planarized layer 46 | 4.1028 | 0.3784 |

Unit: micrometer (μm)

Table Showing Film Thickness of a Planarized Layer Which Includes a Pole Tip Formed According to the First Embodiment On the other hand, Table 6 shows a polishing result, as a comparative example, when a conventional polishing method is used. This comparative example shows the conventional planarization process using a polishing method without the process to reduce the film thickness of a protruding portion described with reference to FIG. 16 and FIG. 17 according to this embodiment. Precisely, in order to planarize the upper surface of the pole tip 42, as shown in FIG. 15, a coating layer 44 is formed by depositing alumina on the whole surface of the substrate by approximately 7.5 μm in thickness which is 1.5 times thicker than the film thickness of the pole tip 42 and then the pole tip 42 is embedded and coated. At this time, a protruding portion which is approximately equal to 12.5 μm in height from the upper surface of the planarized layer 46 is formed on the coating layer 44, which is a thin film pattern, above the pole tip 42. In this state, the polishing for planarization is performed by the CMP equipment shown in FIG. 1.

As shown in Table 6, according to the conventional planarization process, the film thickness of the deposited coating layer 44 is equal to 7.5284 μm on an average value and the range of the measured film thickness is equal to 0.1268 μm. The removal amount by the CMP is equal to 3.4698 μm on an average value and the range is 0.4099 μm. Furthermore, the film thickness of the planarized layer 46 is equal to 4.0586 μm in average and the range is 0.4250 μm.

TABLE 6

| | Average value | Range |
|---|---|---|
| Film thickness of coating layer 44 | 7.5284 | 0.1268 |
| Removal amount by CMP | 3.4698 | 0.4099 |
| Film thickness of planarized layer 46 | 4.0586 | 0.4250 |

Unit: micrometer (μm)

Table Showing Film Thickness of a Planarized Layer Which Includes a Pole Tip Formed by the Conventional CMP Based on Table 5 and Table 6, the planarization process using the polishing method according to this embodiment and the planarization process using the conventional polishing method according to the comparative example are compared. First, in both of this embodiment and the comparative example, the film thickness of the deposited coating layer 44 is substantially the same and the extents of the range are substantially the same. Therefore, the removal amounts of the coating layer 44 by the CMP are substantially the same and the average values of the CMP removal amount according to Table 5 and Table 6 are equivalent. However, it is found that, according to this embodiment, the range of the CMP removal amount is approximately 20% smaller than that of the comparative example. Furthermore, as to the film thickness of the planarized layer 46, both are the same with respect to the desirable film thickness of 4 μm in a point that the average value of 4.1028 μm is achieved according to this embodiment and the average value of 4.0586 μm is achieved according to the comparative example. However, it is found that the range of the film thickness of the planarized layer 46 is approximately 10% smaller compared to that of the comparative example.

Thus, by using the polishing method according to this embodiment, in comparison with heretofore, it is possible to reduce variations in residual film thickness of the surface of the substrate after polishing. Furthermore, according to this embodiment, a fabrication method of a thin film magnetic head which improves a yield of element fabrication by reducing the variations in residual film thickness of the surface of the substrate after polishing can be realize.

In the meantime, after completing the formation of the planarized layer 46 at the pole tip 42, though a diagram is omitted, the first thin film coil made of copper, for example, is formed and the first insulating film is formed over the first thin film coil. Then, the second thin film coil is formed followed by the formation of the second insulating film over the second thin film coil.

Figure 19:
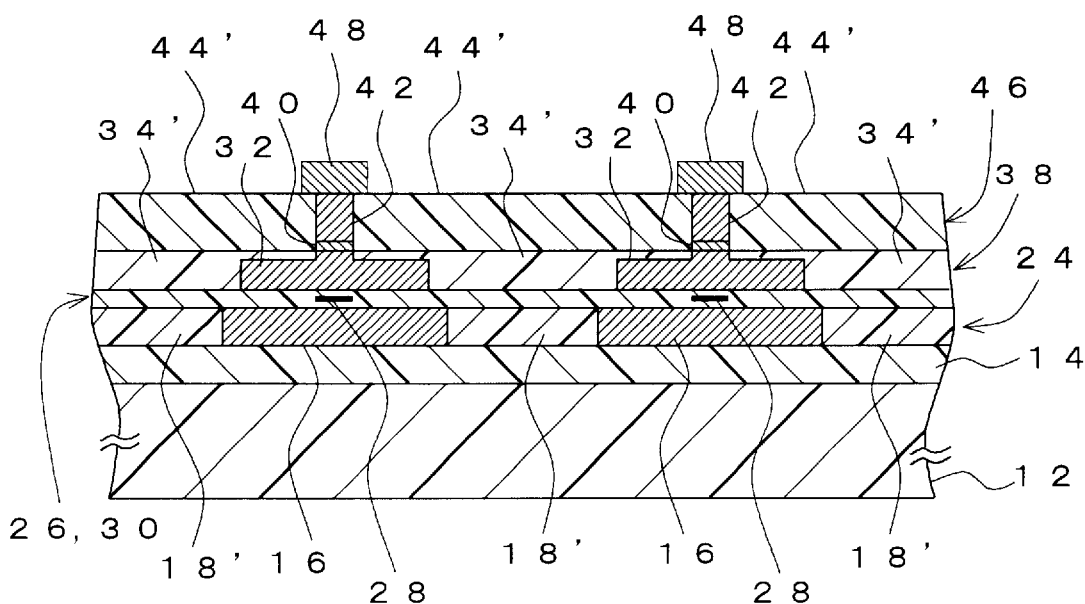
FIG. 19 is a diagram describing a polishing method according to the first embodiment of this invention and a fabrication method of a thin film magnetic head using the aforementioned polishing method.

Next, as shown in FIG. 19, a yoke 48 made of permalloy, for example, is formed according to a predetermined film thickness and shape over the pole tip 42 and the second insulating film which is omitted to show in the diagram. Next, after depositing an overcoat layer made of alumina and the like on the upper portion of the substrate, a side surface adjacent to the magnetoresistive layer 28 and the write gap layer 40 is polished, forming an ABS (Air Bearing Surface) opposing a magnetic recording medium is formed. [The Second Embodiment of the Present Invention]

Figure 21:
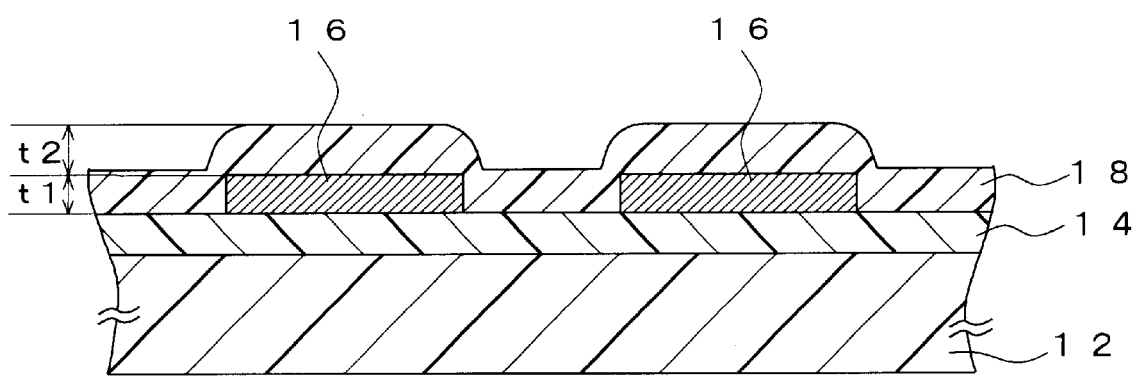
FIG. 21 is a diagram describing a polishing method according to the second embodiment of this invention and a fabrication method of a thin film magnetic head using the aforementioned polishing method.
Figure 22:
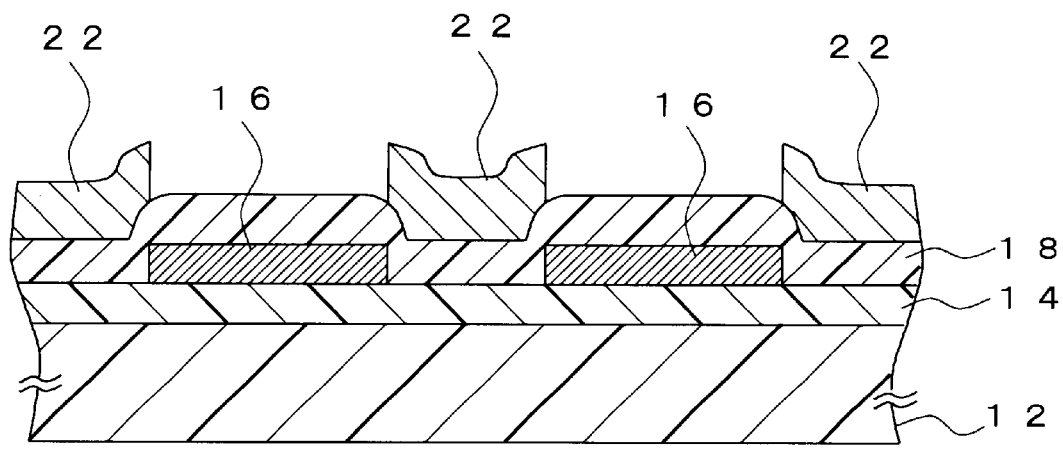
FIG. 22 is a diagram describing a polishing method according to the second embodiment of this invention and a fabrication method of a thin film magnetic head using the aforementioned polishing method.
Figure 23:
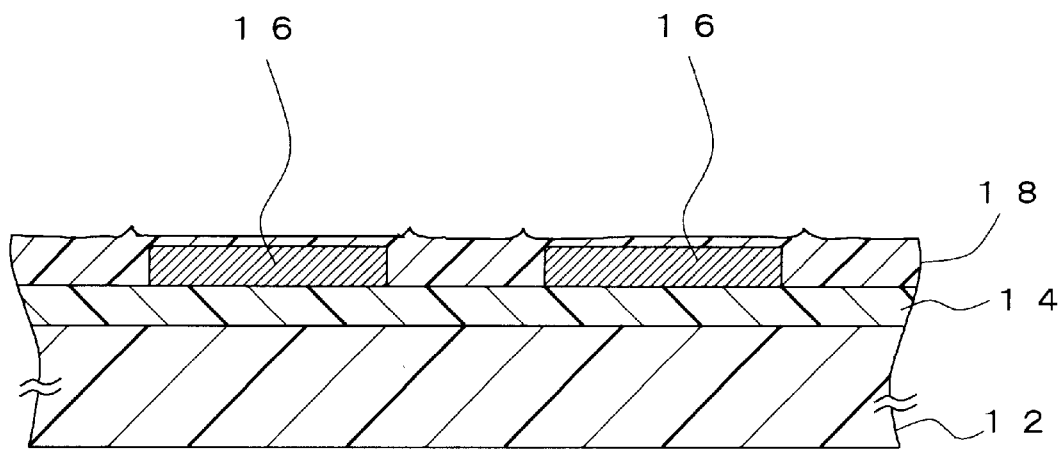
FIG. 23 is a diagram describing a polishing method according to the second embodiment of this invention and a fabrication method of a thin film magnetic head using the aforementioned polishing method.
Figure 24:
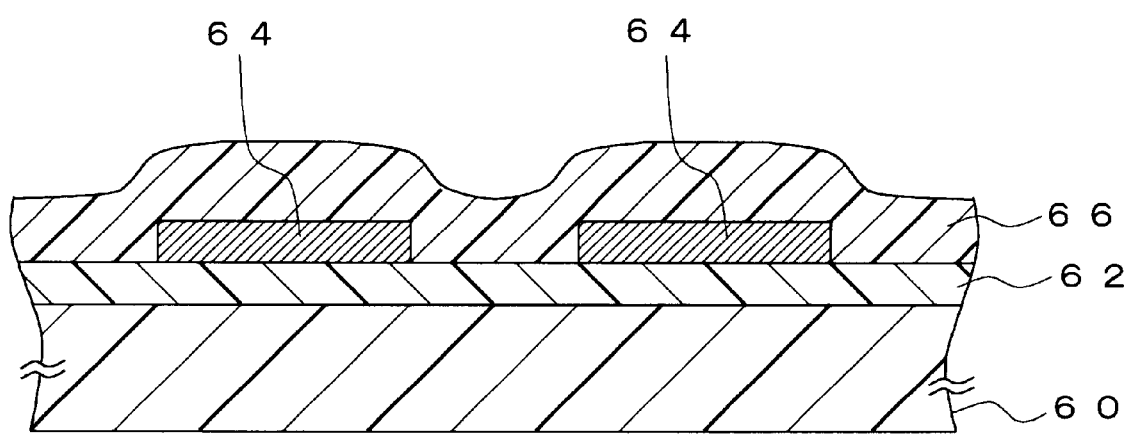
FIG. 24 is a diagram describing a conventional planarization process using a CMP.

Next, a polishing method and a fabrication method of a thin film magnetic head according to the second embodiment of the present invention are described with reference to FIG. 21 through FIG. 23. The polishing method according to this embodiment has a distinctive feature of forming a film thickness of a coating layer, which embeds and coats a thin film pattern, to be substantially the same height as a thin film pattern. This embodiment, as is the case of the first embodiment, is described by using an example of a combination type head laminated by an inductive thin film magnetic head for writing and an MR reading element for reading. FIG. 21 through FIG. 23 show cross sections of the substrate of a thin film magnetic head pole section cut in parallel with a track surface.

First, as shown in FIG. 21, an insulating layer 14 made of alumina, for example, as a lower layer is deposited on an AlTiC substrate 12. Next, after forming a permalloy layer having approximately 3 μm (=t1) in thickness, for example, on a whole surface, patterning is performed and a bottom shielding layer 16 is formed. Next, in order to planarize an upper surface of the bottom shielding layer 16, as shown in FIG. 21, alumina is deposited on the whole surface of the substrate and a coating layer 18 having approximately 3.5 μm in film thickness which is substantially the same as the bottom shielding layer 16 (3 μm) in film thickness is formed, thereby embedding and coating the bottom shielding layer 16. At this time, the coating layer 18 above the bottom shielding layer 16 becomes a protruding portion which is approximately 6.5 μm (=t1+t2) in height from the insulating layer 14 since the film thickness t1=3 μm of the bottom shielding layer 16 is added to the film thickness (t2=3.5 μm) of the coating layer 18 itself.

Next, as shown in FIG. 22, a photoresist layer is formed by coating photoresist, which is approximately 4 μm in thickness, on the whole surface of the substrate. Next, by transferring an opening pattern which is slightly narrower than the width of the bottom shielding layer 16, the photoresist layer is patterned and, as shown in FIG. 22, a mask layer 22 having an opening at the protruding portion at the upper portion of the bottom shielding layer 16 is formed.

Next, as shown in FIG. 22, an isotropic etching by a wet etching is performed using the mask layer as a etching mask, thereby the protruding portion of the coating layer 18 at the bottom of the opening of the mask layer 22 is removed by approximately 3 μm in thickness of the bottom shielding layer 16. Since the coating layer 18 on the periphery of the opening of the mask layer 22 is suitably undercut, in comparison with the state shown in FIG. 22, the protruding portion is shaved and, as a whole, a planarized coating layer 18 can be obtained.

After removing the mask layer 22, a planarization process by the CMP using the CMP equipment shown in FIG. 1 is performed and the upper surface of the substrate 12 is planarized. In the planarization according to the CMP, as is the case of the first embodiment, the polishing is performed until the bottom shielding layer 16 is exposed from the coating layer 18 and ultimately the surface polishing is performed until the thickness of a planarized layer 24 which consists of an embedded layer 18 formed by polishing the coating layer 18 and the bottom shielding layer 16, becomes approximately 2 μm. A shape when the polishing is completed is similar to FIG. 8 in the first embodiment.

Thus, in the polishing method according to this embodiment, as is the case of the first embodiment, a distinctive feature is to polish the surface of the substrate after reducing the film thickness of the protruding portion formed on the surface of the substrate when polishing the surface of the substrate which is a material to be polished; in addition, this embodiment has a distinctive feature in forming a film by controlling the film thickness of the coating layer to be the same or slightly thicker than the film thickness of the bottom shielding layer 16 which is the thin film pattern. Hence, the reason being capable to make the formed film thickness of the coating layer 18 thin, in comparison with heretofore, is nothing but because the protruding portion created by the deposition of the coating layer 18 is removed beforehand by a removal method such as etching, other than the CMP. As previously described as the conventional technique, in order to perform the polishing process by the CMP including a protruding portion formed at a coating layer, considering the difference in progress speed of the polishing at the protruding portion and a lower surface, the coating layer 18 is estimated to be approximately 1.5 times thicker than the lower thin film pattern in film thickness; however, as this embodiment, if the protruding portion is removed beforehand prior to the CMP, the coating layer 18 may theoretically be the same as the thin film pattern in film thickness.

According to the polishing method of this embodiment described above, since the film thickness of the coating layer 18 can be thin, time required to deposit the coating layer 18 can be saved. Also, since the amount of alumina removed by the polishing according to the CMP can be small, the time required for the polishing process can be reduced. Therefore, in the fabrication process of the thin film magnetic head, a throughput of fabricating elements can be improved.

In the meantime, Table 7 shows an example of a result of planarization by the CMP at the bottom shielding layer 16 and the coating layer 18 according to this embodiment. Data shown in Table 7 also shows a result of the film thickness measured at a total of 13 points on the substrate as shown in FIG. 20. As shown in Table 7, in this embodiment, the film thickness of the deposited coating layer 18 is 3.4864 $\mu$m on an average value and the range of the measured film thickness is 58.8 nm. Further, the removal amount by the CMP is 1.4439 $\mu$m on an average value and the range is 0.1821 $\mu$m. Furthermore, the film thickness of the planarized layer 24 (refer to FIG. 8) is 2.0425 $\mu$m in an average value and the range is 0.1902 $\mu$m.

TABLE 7

|  | Average value | Range |
|---|---|---|
| Film thickness of coating layer 18 | 3.4864 | 0.0588 |
| Removal amount by CMP | 1.4439 | 0.1821 |
| Film thickness of planarized layer 24 | 2.0425 | 0.1902 |

Unit: micrometer ($\mu$m)

Table Showing Film Thickness of a Planarized Layer Which Includes a Bottom Shielding Layer Formed According to the Second Embodiment The polishing result according to this embodiment shown in Table 7 and the polishing results of the conventional polishing method shown in Table 2 and the polishing method according to the first embodiment shown in Table 1 are compared. As is evident from each table, since the film thickness of the coating layer 18 of this embodiment can be made approximately 1 $\mu$m lower than that of the conventional method and the first embodiment, the range when the film thickness of the coating layer 18 is formed can be reduced by approximately 20%. Therefore, since the CMP removal amount according to this embodiment can be reduced by approximately 1 $\mu$m than that of the conventional method and the first embodiment, the CMP removal range is largely improved, and the CMP removal amount is approximately 60% smaller compared with the conventional method and approximately 30% smaller compared with the first embodiment. Furthermore, as to the film thickness of the planarized layer 24, with respect to the desirable film thickness which is 2 $\mu$m, the average value of 2.0425 $\mu$m is achieved in this embodiment and substantially the equivalent values are achieved according to the conventional method and the first embodiment. However, according to this embodiment, the range of the film thickness of the planarized layer 24 is reduced by 70% compared with the conventional method and the range can be reduced by approximately 30% compared with the first embodiment.

Thus, by using the polishing method according to this embodiment, in comparison with heretofore, it is possible to realize a polishing method which reduces variations in residual film thickness of the surface of the substrate after polishing and it also is possible to realize a polishing method which reduces the time required for the polishing process.

Furthermore, according to this embodiment, it is possible to realize a fabrication method of the thin film magnetic head which improves a yield of the fabrication elements by reducing the variations in residual film thickness of the surface of the substrate after polishing and it is also possible to realize a fabrication method of a thin film magnetic head which improves a throughput of the fabricating elements by reducing the time required for polishing process.

Next, similarly as described above, an example of the result of forming the planarized layer 38 at the top shielding layer (bottom pole) 32 by applying the polishing method according to this embodiment is shown in Table 8. Table 8 shows a result of planarization by the CMP at the top shielding layer 32 and the coating layer 34 according to this embodiment. Data shown in Table 8 also shows a result of the film thickness measured at a total of 13 points on the substrate as shown in FIG. 20. As shown in Table 8, in this embodiment, the film thickness of the deposited coating layer 34 is equal to 5.0059 $\mu$m on an average value and the range of the measured film thickness is equal to 99.6 nm. The removal amount by the CMP is equal to 1.5193 $\mu$m on an average and the range is equal to 0.1759 $\mu$m. Furthermore, the film thickness of the planarized layer 38 (refer to FIG. 13) is equal to 3.4866 $\mu$m on an average and the range is equal to 0.1896 $\mu$m.

TABLE 8

|  | Average value | Range |
|---|---|---|
| Film thickness of coating layer 34 | 5.0059 | 0.0996 |
| Removal amount by CMP | 1.5193 | 0.1759 |
| Film thickness of planarized layer 38 | 3.4866 | 0.1896 |

Unit: micrometer ($\mu$m)

Table Showing Film Thickness of a Planarized Layer Which Includes a Top Shielding Layer Formed According to the Second Embodiment The polishing result according to this embodiment shown in Table 8, the polishing results according to the conventional polishing method shown in Table 4 and the polishing method according to the first embodiment as shown in Table 3 are compared. As is evident from each table, the film thickness of the coating layer 34 according to this embodiment can be made approximately 1.75 $\mu$m lower than that of the conventional method and the first embodiment. Therefore, since the CMP removal amount according to this embodiment can also be reduced by approximately 1.75 μm than that of the conventional method and the first embodiment, the CMP removal range is largely improved and the range is reduced by approximately 50% compared with the conventional method and by approximately 40% compared with the first embodiment. Furthermore, as to the film thickness of the planarized layer 38, with respect to the desirable film thickness which is equal to 3.5 μm, substantially the equivalent values are achieved in both embodiments. However, according to this embodiment, the range of the film thickness of the planarized layer 38 is reduced by 50% compared with the conventional method and it is possible to reduce by approximately 40% compared with the first embodiment.

Next, furthermore, similarly as described above, a result of forming the planarized layer 46 at the pole tip 42, which structures the top pole, by applying the polishing method according to this embodiment is shown in Table 9. Table 9 shows a result of the planarization by the CMP at the pole tip 42 and the coating layer 44 according to this embodiment. Data shown in Table 9 also shows a result of the film thickness measured at a total of 13 points on the substrate as shown in FIG. 20. As shown in Table 9, in this embodiment, the film thickness of the deposited coating layer 44 is equal to 5.5467 μm on an average value and the range of the measured film thickness is equal to 0.1003 μm. The removal amount by the CMP is 1.4332 μm on an average value and the range is equal to 0.1911 μm. Furthermore, the film thickness of the planarized layer 46 (refer to FIG. 18) is equal to 4.1135 μm on an average value and the range is equal to 0.1984 μm.

TABLE 9

|  | Average value | Range |
|---|---|---|
| Film thickness of coating layer 44 | 5.5467 | 0.1003 |
| Removal amount by CMP | 1.4332 | 0.1911 |
| Film thickness of planarized layer 46 | 4.1135 | 0.1984 |

Unit: micrometer (μm)

Table Showing Film Thickness of a Planarized Layer Which Includes a Pole Tip Formed According to the Second Embodiment The polishing result according to this embodiment as shown in Table 9, and the polishing results according to the conventional polishing method as shown in Table 6 and the polishing method according to the first embodiment as shown in Table 5 are compared. As is evident from each table, the film thickness of the coating layer 44 according to this embodiment can be reduced by approximately 2 μm than that of the conventional method and the first embodiment. Therefore, since the CMP removal amount according to this embodiment can be also reduced by approximately 2 μm than that of the conventional method and the first embodiment, the CMP removal range is largely improved and the range is reduced by approximately 50% compared with the conventional method and by approximately 40% compared with the first embodiment. Furthermore, as to the film thickness of the planarized layer 46, with respect to the desirable film thickness which is 4 μm, substantially the same values are achieved in all embodiments. However, according to this embodiment, the range of the film thickness of the planarized layer 46 is reduced by 50% compared with the conventional method and this embodiment achieves a reduction of approximately 50% compared with the first embodiment.

This invention enables various deformations and is not limited to the embodiment described above. In the embodiment described above, though the isotropic etching by the wet etching is performed to remove the protruding portion, this invention is not limited to this and of course also enables to planarize the protruding portion by patterning a mask layer, which modifies the opening width and the like, using the anisotropic etching (for example, reactive ion etching: RIE) by a dry etching.

According to the embodiment described above, the planarization process by the CMP is performed on the upper surface of a pole tip which structures the top pole and an upper surface of the bottom shielding layer of the thin film magnetic head, the top surface of the top shielding layer. However, this invention may be of course applied to either of these layers. Moreover, the polishing method according to this invention can be applied to other layers which structure the thin film magnetic head.

Furthermore, in the embodiment described above, though the example of the polishing method according to this invention applied to the CMP is used to describe, this invention is not limited to this and the polishing method according to this invention can also be used for a mechanical polishing, for example.

Moreover, in the embodiment described above, though the example of the fabrication method of the thin film magnetic head is used to describe, the polishing method according to this invention is not limited to this and can also be applied to polish the surface to be polished, where a plurality of layers with different hardness are exposed. Furthermore, this polishing method in this embodiment can be applied, for example, to a polishing process or a planarization process in a semiconductor device fabrication method.

As described above, according to this invention, since the accuracy of the planarization by the CMP can be improved, a yield of the fabricated elements can be improved. Furthermore, since the time to form the insulating layer used for embedding in the CMP is reduced, the time required for the fabrication process can be reduced. Also, since the usage amount of the insulating layer for embedding can be reduced, it is possible to suppress a cost in fabrication.

What is claimed is:

1. A polishing method of polishing a surface of a material to be polished for a thin film magnetic head, comprising:
    polishing the surface of a thin film shielding layer after reducing a film thickness at a protruding portion formed on the surface;
    patterning an etching protection film after forming the etching protection film on the surface;
    opening the etching protection film over the protruding portion;
    reducing the film thickness of the protruding portion by etching;
    wherein an opening is formed to have a width substantially equal to the length obtained by reducing the double thickness of the film of a thin film pattern from the width of the thin film pattern.

2. A polishing method as set forth in claim 1, wherein the protruding portion is formed on a coating layer over a thin film pattern, the coating layer coats and embeds the thin film pattern formed on the material to be polished.

3. A polishing method as set forth in claim 2, wherein an etching protection film is formed on the coating layer.

4. A polishing method as set forth in claim 2, wherein the coating layer is formed to have a film thickness equal to or thicker than the film thickness of the thin film pattern.

5. A polishing method as set forth in claim 2, wherein the coating layer is formed of an insulating material.

6. A polishing method as set forth in claim 1, wherein the etching is an isotropic etching.

7. A polishing method as set forth in claim 1, wherein the etching protection film is made of photoresist.

8. A polishing method as set forth in claim 1, wherein the etching protection film is made of metal material.

9. A polishing method as set forth in claim 1, wherein the polishing step comprising:

polishing the surface by a chemical mechanical polishing after reducing the film thickness of the protruding portion.

10. A fabrication method of a thin film magnetic head having a planarization process for planarizing a surface of a material to be polished by polishing comprising:

the planarization process having a polishing step of polishing the surface after reducing a film thickness at a protruding portion formed on the surface by using a mask layer formed to have almost the same width as the length derived by subtracting twice the film thickness of a bottom shielding layer from the width of the bottom shielding layer.

11. A fabrication method of a thin film magnetic head having a planarization process for planarizing a surface of a material to be polished by polishing comprising:

the planarization process having a polishing step of polishing the surface after reducing a film thickness at a protruding portion formed on the surface by using a mask layer formed to have almost the same width as the length derived by subtracting twice the film thickness of a top shielding layer from the width of the top shielding layer.

12. A fabrication method of a thin film magnetic head having a planarization process for planarizing a surface of a material to be polished by polishing comprising:

the planarization process having a polishing step of polishing the surface after reducing a film thickness at a protruding portion formed on the surface by using a mask layer formed to have almost the same width as the length derived by subtracting twice the film thickness of a top pole portion from the width of the top pole portion.

* * * * *